United States Patent [19]

Bowman

[11] Patent Number: 5,115,447
[45] Date of Patent: May 19, 1992

[54] ARC FURNACE ELECTRODE CONTROL

[75] Inventor: Ben B. Bowman, Geneva, Switzerland

[73] Assignee: UCAR Carbon Technology Corporation, Danbury, Conn.

[21] Appl. No.: 639,547

[22] Filed: Jan. 10, 1991

[51] Int. Cl.$^5$ .............................................. H05B 7/144
[52] U.S. Cl. ..................... 373/102; 373/103; 373/104; 373/105; 373/106
[58] Field of Search .............. 373/102, 103, 104, 105, 373/106, 47, 50, 72

[56] References Cited

U.S. PATENT DOCUMENTS

| | | | |
|---|---|---|---|
| 3,376,374 | 4/1968 | Bobo | 373/105 |
| 3,597,518 | 8/1971 | Roberts | 373/102 |
| 4,096,344 | 6/1978 | Munson | 373/105 |
| 4,324,944 | 4/1982 | Weihrich et al. | 373/106 |
| 4,349,912 | 9/1982 | Bello | 373/105 |
| 4,399,545 | 8/1983 | Harmsen et al. | 373/94 |
| 4,663,764 | 5/1987 | Bretthauer et al. | 373/104 |
| 4,683,577 | 7/1987 | Bretthauer et al. | 373/105 |

FOREIGN PATENT DOCUMENTS 1453630  1/1989  U.S.S.R. ............ 373/104

OTHER PUBLICATIONS

Solution of Arc-furnace Electrical Circuit in Terms of Arc Voltage—B. Bowen Ironmaking and Steelmaking 1982, vol. 9, No. 4 pp. 178–187.
BBC Brown Boveri Publ. No. CH-1H122 650 F.
Auto. Arc Furnace Cont. H. Schaffer et al Iron & Steel Engr. Aug. 1986 pp. 36–40.
Arc resistance regulation and refractory erosion control—R. W. Roberts (Robican) Electric Furnace Proceedings 1976.
Char. of Electrode Regulation System (Timken-Krupp) I&S.M. Feb. 1988 pp. 23–30.
G. SIMELT electrode control system for electric arc furnaces Georg Weihrich et al, Metallurgical Plant and Technology Mar. 1981.

Primary Examiner—Bruce A. Reynolds
Assistant Examiner—Tu Hoang
Attorney, Agent, or Firm—E. Lieberstein

[57] ABSTRACT

System for controlling the positions of each of the three electrodes of a three phase electric furnace to maintain optimum real power delivered to the furnace in the event of electrode short circuiting or arc extinction due to scrap movement in the furnace. The system includes means for determining the magnitude of arc voltage and arc current and means to change the position of selected electrodes when either arc voltage or arc current is determined to be zero.

6 Claims, 6 Drawing Sheets

1

ARC FURNACE ELECTRODE CONTROL

FIELD OF INVENTION

The present invention relates to a system for controlling the length of the arc of one or more of the three electrodes of a three phase electric arc furnace. More particularly, the present invention relates to a system wherein the pre-set voltage of a controller which regulates the height of an electrode above the furnace scrap charge is adjusted upon the occurrence of a disruptive event at another electrode, e.g. a short circuit or loss of arc due to scrap fall, so that electrode arc lengths are changed and increased real power, MW, is delivered to the furnace during such events leading to increased furnace efficiency.

BACKGROUND OF THE INVENTION

Electric arc furnaces are widely used for the production of hot metal from iron and steel scrap and the overall objective in arc furnace melting is to produce hot metal of the desired quality at the lowest cost. By conducting meltdown, i.e. the melting of scrap, at optimum power levels and minimizing the time duration of interruptions of optimum power level operation during meltdown a maximum cost saving can be achieved since most of the energy required in producing hot metal product is used during meltdown. In a three phase electric arc furnace, the secondary circuit of a three phase transformer is connected to the three electrodes of the furnace so that each electrode is powered by a different phase of the secondary circuit, the powering phase voltage being the voltage from phase to neutral, i.e. ground, to which the furnace shell is electrically connected. At the beginning of the melting operation, i.e. melt down, metal scrap is charged to the furnace and the three electrodes descend toward the scrap charge. One of the electrodes first approaches the charge and stops and a second electrode approaches the charge and an arc is created at both electrodes. In this circumstance, the furnace is operating single phase, and, inefficiently, until the third electrode descends to create its arc and three phase furnace operation commences and scrap meltdown begins. In a typical commercial operation, an automatic regulator device is provided for each electrode and a set point voltage proportional to the phase voltage is selected for each regulator device to maintain a desired predetermined distance between each electrode tip and the scrap below. This distance (and the set point) is selected by the furnace operator based upon the type of charge material, available power input and other furnace parameters and is commonly about 100 to 300 mm. This selected pre-determined distance is maintained by the respective regulator devices during meltdown of the electrodes through the scrap by comparing the selected set point voltage with measured voltage and/or current information for each of the electrodes. The regulator operation proceeds routinely during melt-down to continuously maintain the predetermined distance between the electrode tips and the scrap below unless there is a disruptive occurrence, e.g. a "scrap fall" whereby scrap collapses inwardly toward and against the side of an electrode to thereby short circuit the electrode. Under such circumstances, current will increase substantially in the short-circuited electrode and also in an adjacent electrode. With conventional regulating systems the regulators of the thus affected electrodes will operate to rapidly raise these electrodes to quickly reduce current in the electrodes and then re-establish the pre-selected distance between the electrode tip and the scrap below, based on the initially selected set point voltage. While the short circuit due to scrap-fall persists the real power, MW, applied to the scrap charge is substantially lessened and the result is that the average real power applied to the furnace charge during meltdown is reduced and the cost of furnace operation correspondingly increased.

In the situation where a scrap fall below the electrodes increases the distance from an electrode tip to the scrap so that the arc is extinguished, the particular electrode is open circuit and three phase operation is interrupted and the furnace operation is single phase, using only two arcs and there is a substantial drop in power delivered to the change and furnace operation is thus highly inefficient. With conventional regulating systems, the regulator of the extinguished electrode operates to quickly lower this electrode to re-establish the pre-selected distance between the electrode tip and the scrap below based on the initially selected set point voltage. While the extinguished arc condition due to scrap fall persists the real power, MW, applied to the scrap charge is substantially lessened and the result is that the average real power applied to the furnace charge during meltdown is reduced and the cost of furnace operation correspondingly increased. It is accordingly an object of this invention to provide a regulation system for minimizing the reduction which occurs due to "scrap fall" at an electrode during meltdown.

SUMMARY OF THE INVENTION

The present invention is an improvement in a system for the individual control of the arc furnace electrode positions of each of a first, second and third electrode in a three phase electric arc furnace wherein the electrodes are respectively powered by individual phase-to-neutral voltages of a transformer secondary winding having a relative phase sequence of first electrode before second electrode before third electrode (i.e. the voltage at the first electrode peaks, in time, before the voltage at the second electrode and the voltage at the second electrode peaks before the voltage at the third electrode). Each electrode of the furnace has a separate positioning means and a desired predetermined position of the respective electrodes is based on an individual pre-set voltage value which is proportional to the phase-to-neutral voltage powering such electrode and this voltage is continuously compared to a variable voltage responsive to the instantaneous position of such electrode. During routine furnace operation the result of the comparison is an error signal which is applied to the electrode positioning means, so as to cause the electrode positioning means to move such electrode toward its desired pre-determined position.

For the disruptive occurrence situation where a scrap fall during meltdown results in the short circuit of a furnace electrode, first means are provided for respectively continuously determining the magnitude of the arc voltage of each electrode and means responsive to the first means are provided to instantaneously increase the pre-set voltage of one of the three electrodes of to increase the arc length of this electrode the furnace when the arc voltage of another of said electrodes is determined to be zero, the one said electrode being the electrode next ahead in phase rotation of said another electrode.

For the situation where a scrap fall during melt down results in the extinction of the arc of an electrode due to increased distance from the electrode tip to the scrap below, second means are provided for respectively continuously determining the magnitude of the arc current of each electrode and means are provided responsive to the second means to instantaneously decrease the pre-set voltage of two of the furnace electrodes to shorten the respective arc lengths thereof when the arc current of the other furnace electrode is determined to be zero.

DETAILED DESCRIPTION

Figure 1:
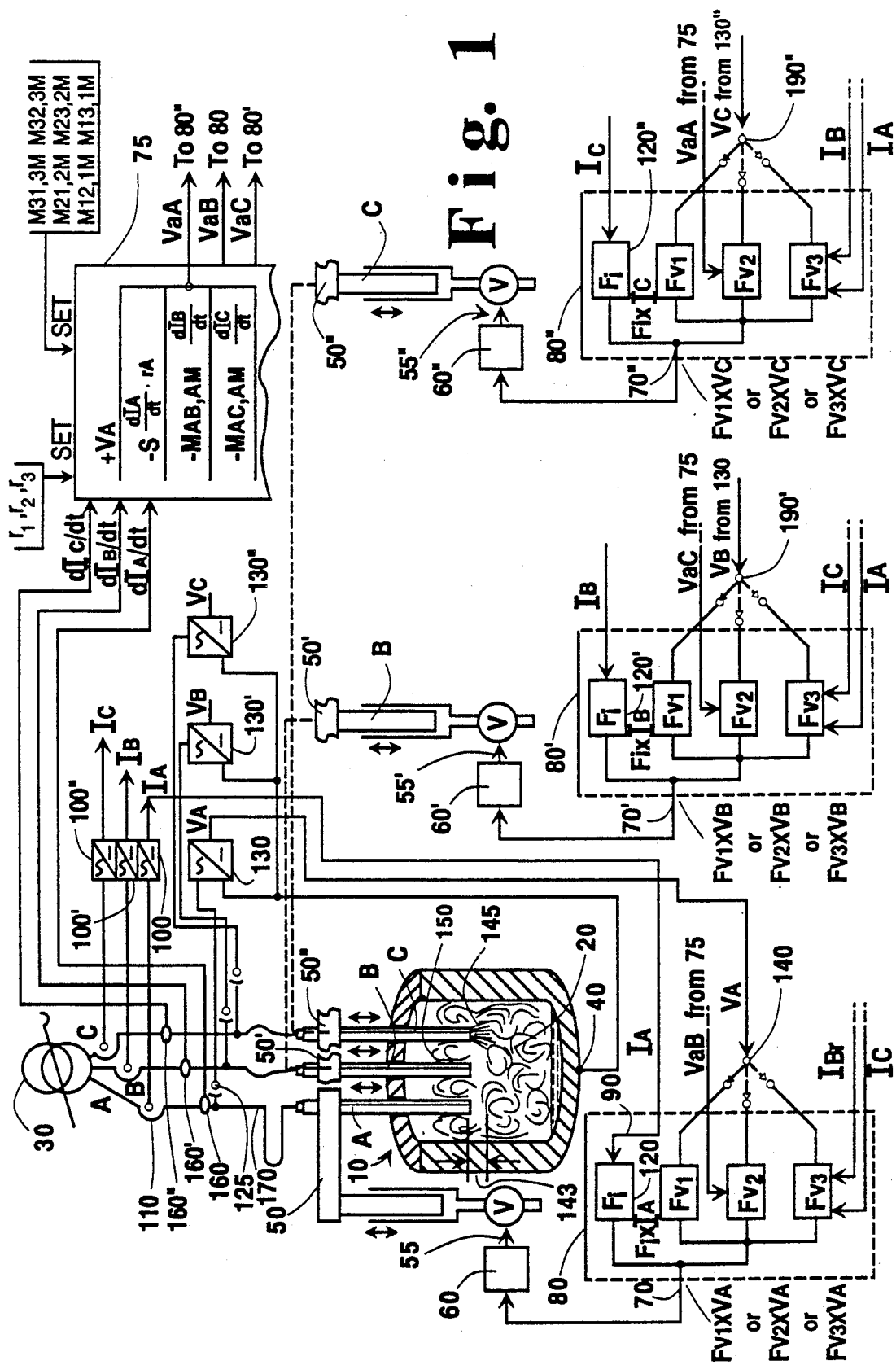
FIG. 1 is a schematic block diagram and flow chart illustrating an embodiment of the present invention.

The present invention will be more fully understood with reference to FIG. 1 which is a schematic block diagram and flow chart illustrating a particular embodiment of the present invention.

Figure 2:
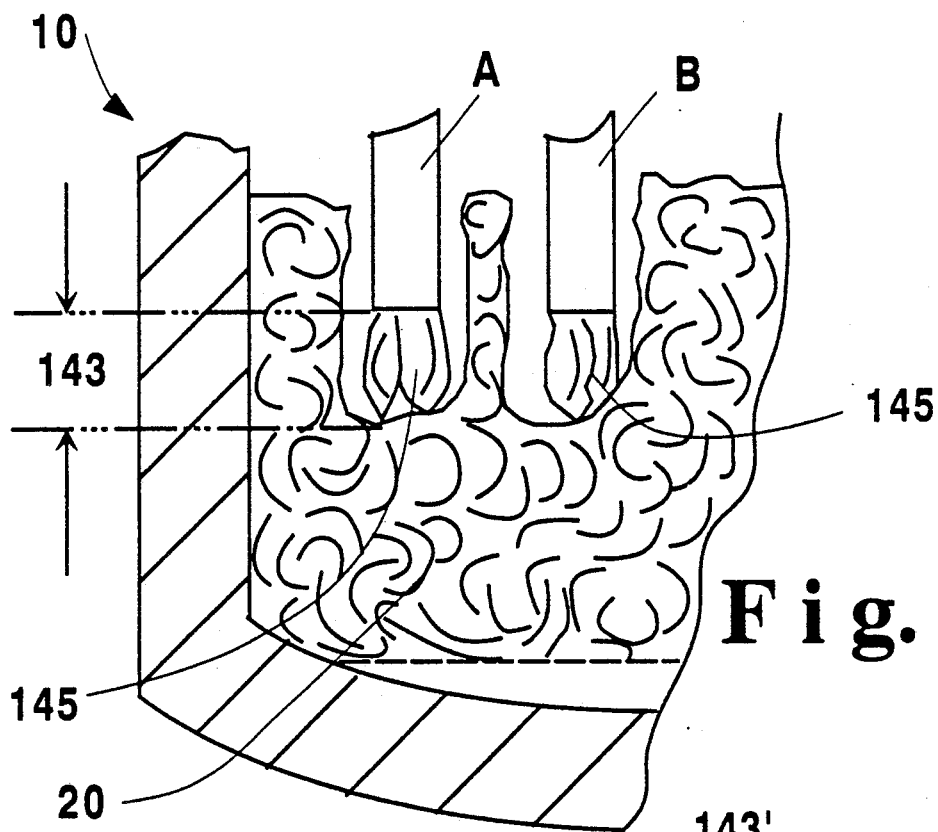
FIG. 2 illustrates a typical electrode position during scrap melt down.
Figure 3:
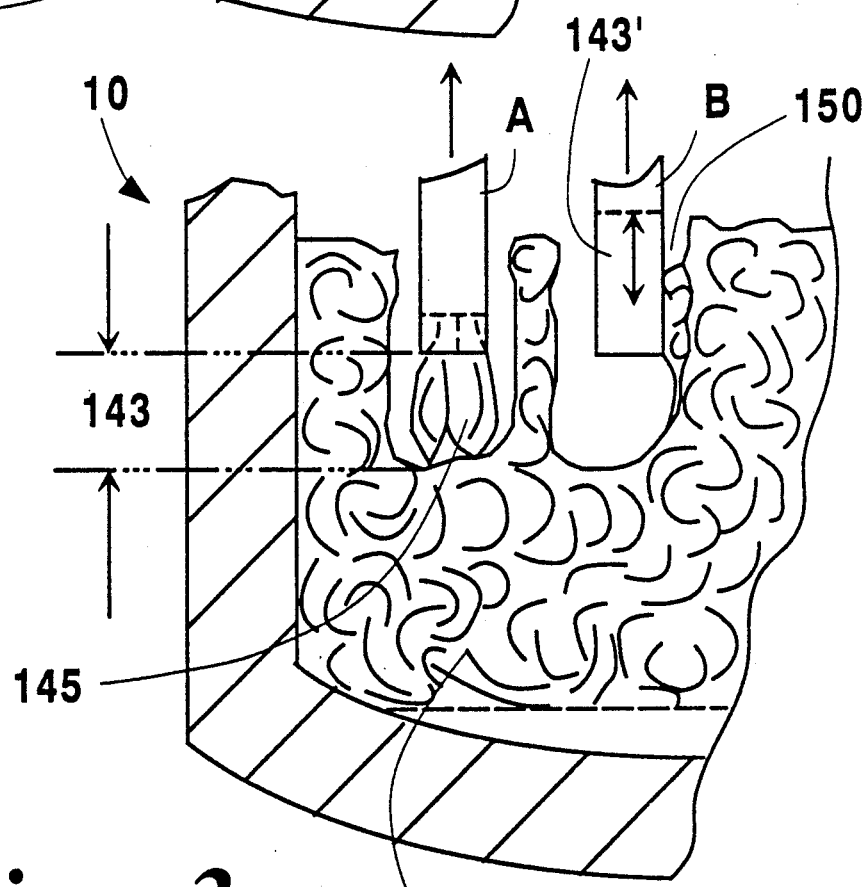
FIG. 3 illustrates a condition of scrap fall against an electrode causing a short circuit of the electrode arc.
Figure 4:
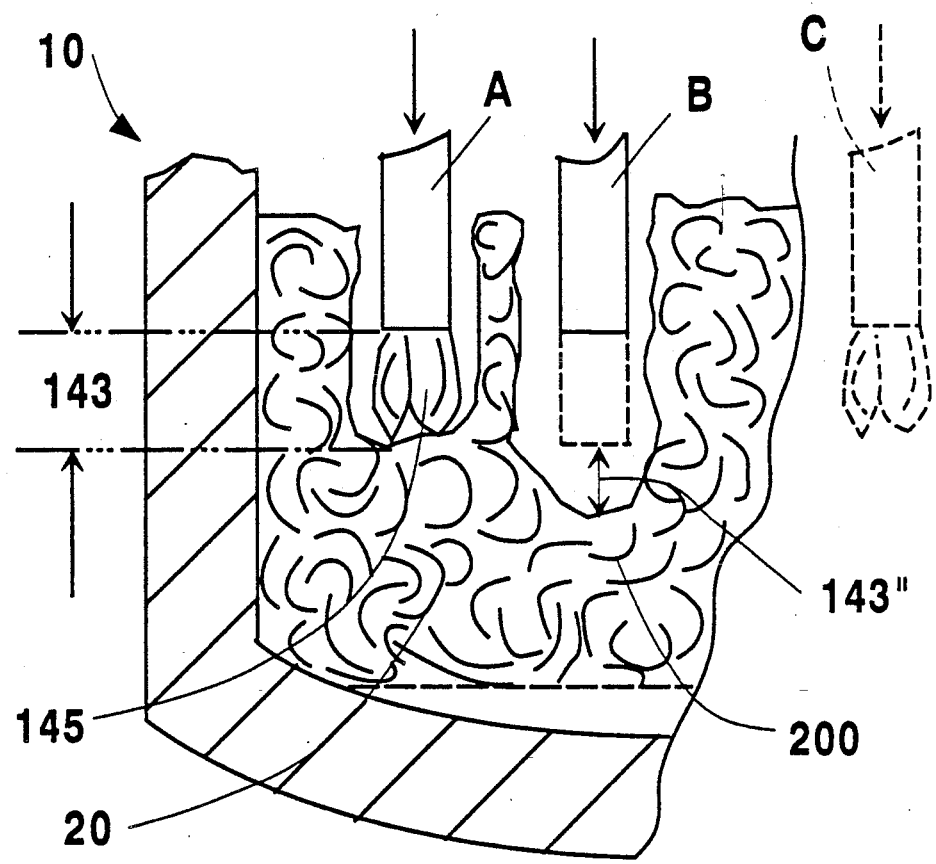
FIG. 4 illustrates a condition of scrap fall beneath an electrode causing extinction of the electrode arc.

With reference to FIG. 1 a three-phase electric furnace is shown at 10 with a scrap charge 20 contained and being melted therein which surrounds electrodes A, B, C which are respectively connected to separate phase windings of the secondary of a three-phase transformer 30. The neutral point of the three phase system is common with the furnace shell as indicated at 40 and the phase rotation of the three phase system for purposes of this description is A, B, C, i.e. the phase to neutral voltage at electrode A peaks before the voltage at electrode B and the voltage at electrode B peaks before the voltage at electrode C. Each electrode A, B, C is respectively provided with an identical conventional positioning device and a regulating system of which only the arrangement for one electrode is presented in full detail since the other arrangements are the same. The electrode positioning devices, e.g. electrohydraulic systems 50, 50', 50" respond to the voltage signal output 55 of a conventional controller 60 which can suitably be of the proportional integral action, or other type. The voltage signal at 55 is developed in response to an error signal voltage at 70 which results from a comparison, e.g. the sum, of the voltages applied to summing network 80. Summing network 80 receives a signal at 90 which is proportional to the current in electrode A and is obtained from rectifier unit 100 in response to the continuous alternating current signal provided by current transformer 110 which is proportional to the current instantaneously flowing in electrode A. A scaling factor Fi is applied at 120 to provide a convenient voltage level for comparison at 70, e.g. 30 volts for an electrode current of 60 kA. The phase-to-neutral voltage powering electrode A is measured at voltage transformer 125 and the alternating voltage signal thus obtained is rectified at voltage rectification unit 130 and a signal proportional to the voltage of electrode A is present at 140 and for routine operation of furnace 20 this signal is scaled by a scaling factor Fv1 at scaling unit 150 to provide to provide a convenient voltage level for comparison at 70 with the signal proportional to the current $I_A$ of electrode A, e.g. 30 volts for a phase-to-neutral voltage of 360 V. The scaling of the signal proportional to the phase-to-neutral voltage, $V_A$, and the scaling of the electrode current, $I_A$, are conventionally adjustably settable and are selected so that the set values will establish a desired, predetermined height 143 of the tip of electrode A above scrap charge 30 as shown also in FIG. 2. This pre-determined distance 143 establishes the length of arc 145, shown with more particularity in FIGS. 2-4, is routinely selected by the furnace operator on the basis of the type of charge material and well known furnace parameters, and the output 55 of controller 60, causes positioning device 50 to maintain the pre-determined distance 143 and the desired arc length 145 for electrode A in response to the error signal voltage at 70, raising the electrode A when the $I_A$ current signal applied to scaling unit 120 increases and lowering the electrode A when such signal decreases. This continuous regulating operation proceeds throughout routine meltdown of the charge for each of the electrodes A,B,C to provide optimum delivery of real power, MW, to the charge until a disruptive condition occurs such as, by way of example, a fall of scrap against an electrode which short circuits the electrode tip as illustrated at 150 in FIG. 1 and FIG. 3 for electrode B. Upon the occurrence of this situation, the current in the electrode B, $I_B$, greatly increases, increasing the voltage signal applied at 120' and developing an error signal at 70' which causes the positioning system 50' for electrode B to rapidly raise electrode B to re-establish a distance, 143', equal to the pre-determined distance 140 between the tip of electrode B and the scrap charge 20, at which time the routine regulation operation proceeds once again for electrode B as above-described. At the time of the above-described scrap-fall at electrode B, while the electrode current in electrode B greatly increases, but is not a definitive determination of a short circuit condition, the arc voltage $V_aB$ of electrode B is at zero level since it was short-circuited by the scrap fall 150 and the determination of a zero value arc voltage is a definitive determination of a short circuit condition. The power delivered by electrode B to the scrap charge 20 under these circumstances is minimal and the currents in the adjacent electrodes are substantially changed since furnace operation under such circumstances involves only two arcs. Until routine electrode regulation operation of electrode B is restored, which can take ten seconds or more, the real power, MW, delivered from the electrodes to the furnace scrap charge 20 is substantially diminished. It has been discovered that the time required to re-establish routine electrode regulation and electric furnace operation can be shortened, and real power efficiency thus increased, when, upon the occurrence of a scrap fall which short circuits an electrode of a three phase electric furnace, the pre-determined desired set voltage for control of the desired, predetermined height of the electrode, which is next ahead in phase rotation, is immediately increased so that the electrode of the "phase ahead" is raised and its arc lengthened and regulation of this electrode is controlled by the newly established set point voltage until the initially, scrap fall short-circuited, electrode is re-established at its original predetermined height and its arc voltage re-established. Upon this occurrence, the set point value of the "phase ahead" electrode is returned to its previous, initial value and routine electrode regulation continues as before the occurrence of the disruptive event. With reference to FIGS. 1 and 3 upon the occurrence of the above-mentioned scrap fall 150 which short circuits the tip of electrode B, the previously established arc 145' is short circuited as indicated and the magnitude of its voltage drop $V_aB$ becomes zero.

Figure 5:
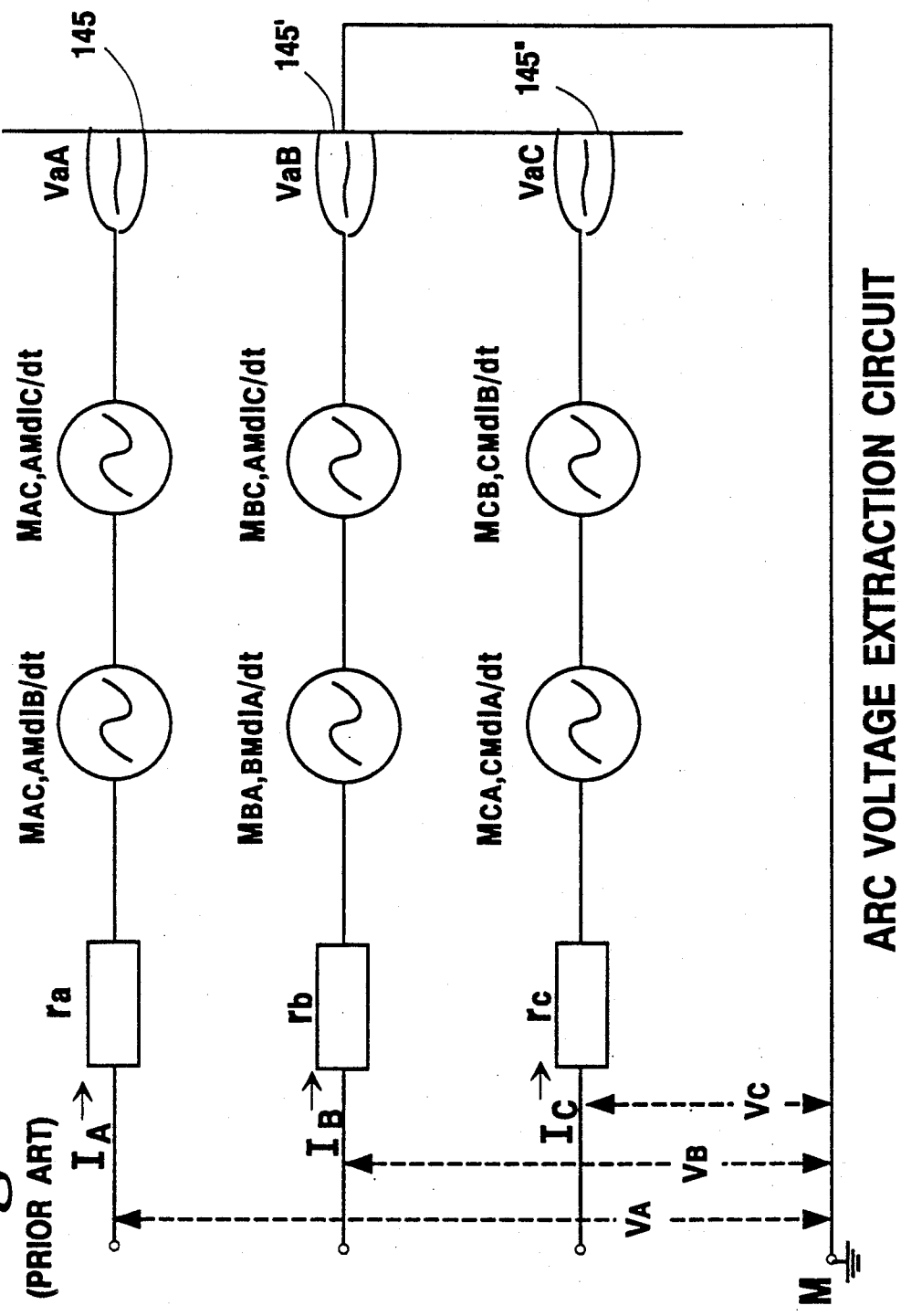
FIG. 5 shows a prior art circuit for determining the value of electrode arc voltage.

In accordance with the improved system of the present invention, the arc voltages, $V_aA$, $V_aB$, $V_aC$ of the respective electrodes A, B, C are continuously determined and when one of these is determined to have a zero value, e.g. electrode B on account of a short circuiting scrap fall, the set point for the "phase ahead" electrode, in this exemplary case electrode A, is increased. For example, with reference to FIG. 1, for electrode A, a "Rogowski" coil 160 (such as described in BBC-Brown Bovari publication No. CH-1H 122 650F dated Lebada and Machler) is provided surrounding the secondary cable 70 for electrode A and identical coils 160', 160" are provided for electrodes B and C. These coils respectively develop induced signals:

$$\frac{dI_A}{dt} \quad \frac{dI_B}{dt} \quad \frac{dI_c}{dt}$$

which are integrated at 180 to continuously provide alternating current values for $I_A$, $I_B$, $I_C$ and the signals developed in the coils 160, 160', 160" are further utilized to determine the magnitude of the respective arc voltage $V_aA$, $V_aB$, $V_aC$, using, for example, the equivalent circuit of the well known "Clausthal Circuit* illustrated schematically in FIG. 5 as the basis for such determination as follows:

$$V_aA = V_A - \left( I_A r_A + M_{AB,AM}\frac{dI_B}{dt} + M_{AC,AM}\frac{dI_c}{dt} \right)$$

$$V_aB = V_B - \left( I_B r_B + M_{BA,BM}\frac{dI_A}{dt} + M_{BC,BM}\frac{dI_c}{dt} \right)$$

$$V_aC = V_C - \left( I_C r_C + M_{CA,CM}\frac{dI_A}{dt} + M_{CB,CM}\frac{dI_B}{dt} \right)$$

where:

$I_A$, $I_B$, $I_c$ phase current flowing through electrodes A, B, C respectively
where:

$r_A$, $r_B$, $r_c$ ohmic resistance of the phase circuit from transformer secondary up to the electrode tip for phases A, B, C respectively.

where $$\frac{dI_A}{dt}, \frac{dI_B}{dt}, \frac{dI_c}{dt}$$

rate of change of current with respect to time for phases A, B, C respectively
where:

$V_aA$, $V_aB$, $V_aC$ electrode arc voltages from tip of electrode to charge (ground-neutral) for electrodes A, B, C respectively where:

$M_{AB,AM}$ mutual inductance between the current loop "phase A to phase B" and the current loop "Phase A to ground."

$M_{BA,BM}$ mutual inductance between the current loop "phase B to phase A" and the current loop "phase B to ground."

$M_{CA,CM}$ mutual inductance between the current loop "phase C to phase A" and the current loop "phase C to ground."

$M_{AC,AM}$ mutual inductance between the current loop "phase A to phase C" and the current loop "phase A to ground."

$M_{BC,BM}$ mutual inductance between the current loop "phase B to phase C" and the current loop "phase B to ground."

$M_{CB,CM}$ mutual inductance between the current loop "phase C to phase B" and the current loop "phase C to ground-neutral."

\* K. BRETTHAUER and K. TIMM: Electrowärme Int., March 1970, 28, 115–120.

As can be seen, the arc voltage of an electrode is conveniently derived by subtracting inductive and resistive voltage drops from the secondary-to-ground phase voltages. The resistance values for $r_A$, $r_B$, $r_C$ and the mutual inductance "M" values vary for each furnace and are obtainable by measurement using conventional short circuit and open circuit tests on the particular furnace. Typical values for arc furnaces of 60 ton capacity and over are indicated in the table below.

TABLE

| TYPICAL VALUES FOR THREE PHASE 60 HERTZ ARE FURNACE | |
|---|---|
| $r_A$ | 0.4 milliohm |
| $r_B$ | 0.4 milliohm |
| $r_c$ | 0.4 milliohm |
| $M_{AB,AM}$ | 2.98 milliohm |
| $M_{BA,BM}$ | 3.25 milliohm |
| $M_{CA,CM}$ | 3.45 milliohm |
| $M_{AC,AM}$ | 3.62 milliohm |
| $M_{BC,BM}$ | 3.28 milliohm |
| $M_{CB,CM}$ | 2.85 milliohm |

With the values for the above-described parameters established and with reference to FIG. 1 the determined values for the respective arc voltages $V_aB$, $V_aC$, $V_aA$ are obtained from summing network 75 and are applied respectively to the summing networks 80, 80', 80" of the "phase ahead" electrodes; for example, when the arc voltage at electrode B, $V_aB$, is determined at 75 to be zero, a relay device 140 responds to this condition and removes scaling factor $FV_1$ from the summing network ($FV_3$ hereinafter described is also out of the summing network for his condition) and scaling factor $FV_2$ replaces $FV_1$ in the summing network 80. The scaling factor $FV_2$ is larger than the scaling factor $FV_1$ and as a result a higher voltage instantaneously appears at 70 and causes electrode A to move rapidly upward to increase the distance between the tip of electrode A and the scrap charge below and lengthen the arc at the tip of electrode A. In commercial furnace operation, scaling factor $FV_1$ is selected at a value of about 0.5 to 0.85 which means that the initial set voltage appearing at 70 is 0.5 to 0.85×the phase-to-neutral voltage powering the electrode A; the particular value in this range is selected routinely by the furnace operator based on the type of scrap and furnace parameters. Upon the determination that the arc voltage at electrode B, $V_aB$, is zero, and the selection of scaling factor $FV_2$, a higher scaling factor in the range of 0.85 to 0.94 times the phase-to-neutral voltage powering electrode A is applied at 70 and this higher scaling factor remains operable until the arc voltage $V_aB$ of electrode B, the short circuited electrode, is determined to have increased from zero and returned to its pre-scrap fall value, under which circumstances the relay device 140 re-instates $FV_1$ as the operable scale factor for the phase-to-neutral voltage, $V_{AU}$ at summing network 80.

A further type of disruptive occurrence can occur during scrap meltdown which is the falling away of scrap beneath an electrode to the extent that the arc of the electrode is extinguished and the electrode current becomes zero. With reference to FIGS. 4 and 1, upon the falling away of scrap from beneath electrode B, as indicated at 200, the arc thereof is extinguished and the current in electrode B is determined to be zero, e.g. by the absence of a signal from Rogowski coil 160'. Electrode B is rapidly lowered under such circumstances to re-establish the pre-determined distance between its electrode tip and the scrap charge and relay device 140 simultaneously replaces scaling factor $FV_1$ with scaling factor $FV_3$ at both of the other electrodes, electrode A and electrode C, to provide an error voltage at 70 which will cause positioning means 50, 50" to rapidly lower both electrodes A and C to and thus shorten the arcs of electrodes A and C until the desired pre-determined distance between the tip of electrode B and the scrap charge is re-established. Under the conditions that the scaling factor $FV_1$ is selected at a value of 0.5 to 0.85 as hereinabove described, $FV_3$ is selected at a lower value of 0.28 to 0.49 × the phase-to-neutral voltage powering electrodes A and C and this lower scaling factor remains operable until the arc voltage of electrode B is reestablished.

Studies have shown that the afore described procedure of raising the "phase ahead" electrode upon the occurrence of a scrap fall which short circuits an electrode and the lowering of two electrodes upon the extinguishment of ah electrode arc in the other electrode will lead to a MW increase of between 2 and 3% during scrap meltdown.

Figure 6:
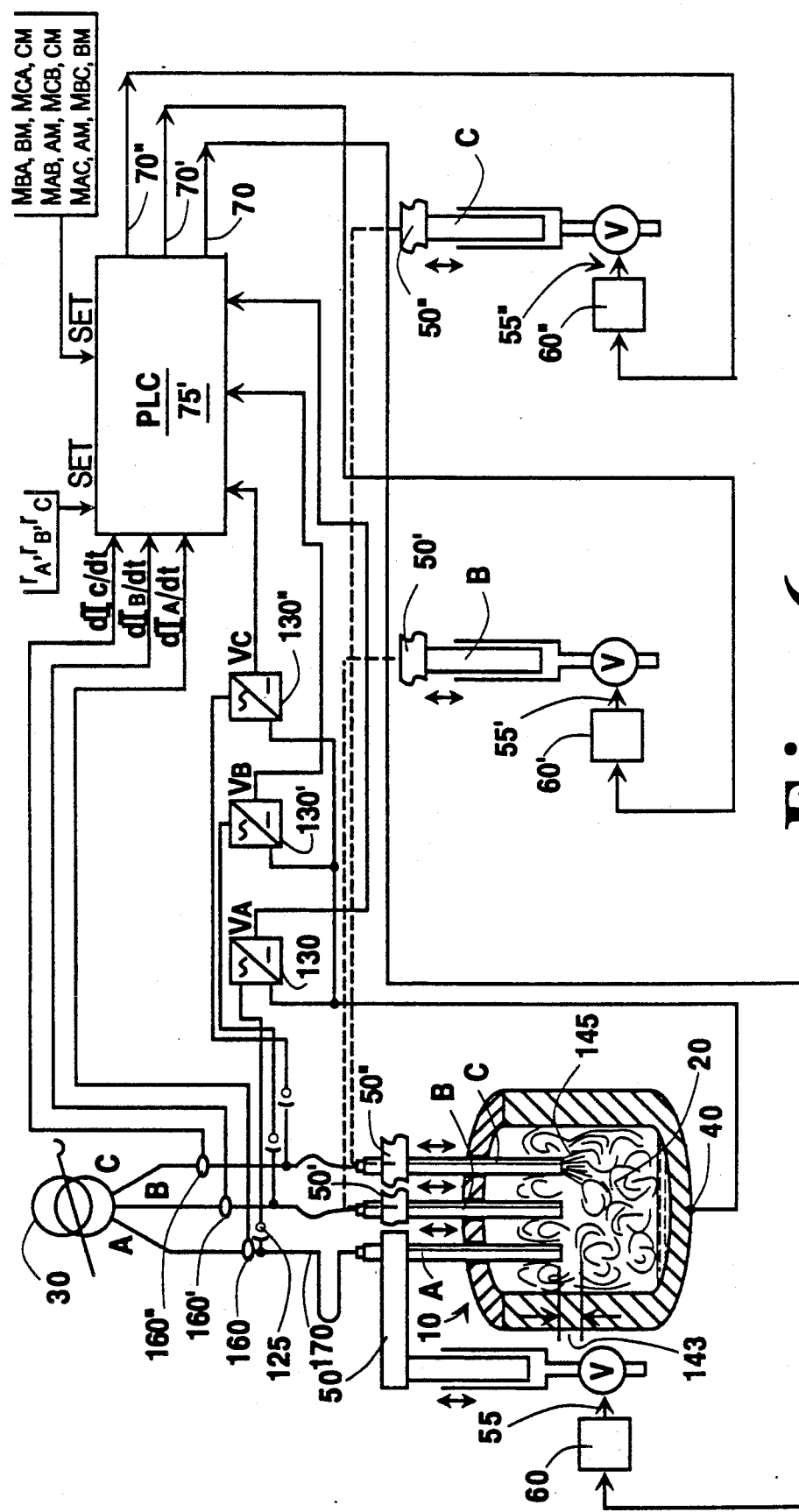
FIG. 6 is a block diagram and flow chart of a further embodiment of the present invention.
Figure 7:
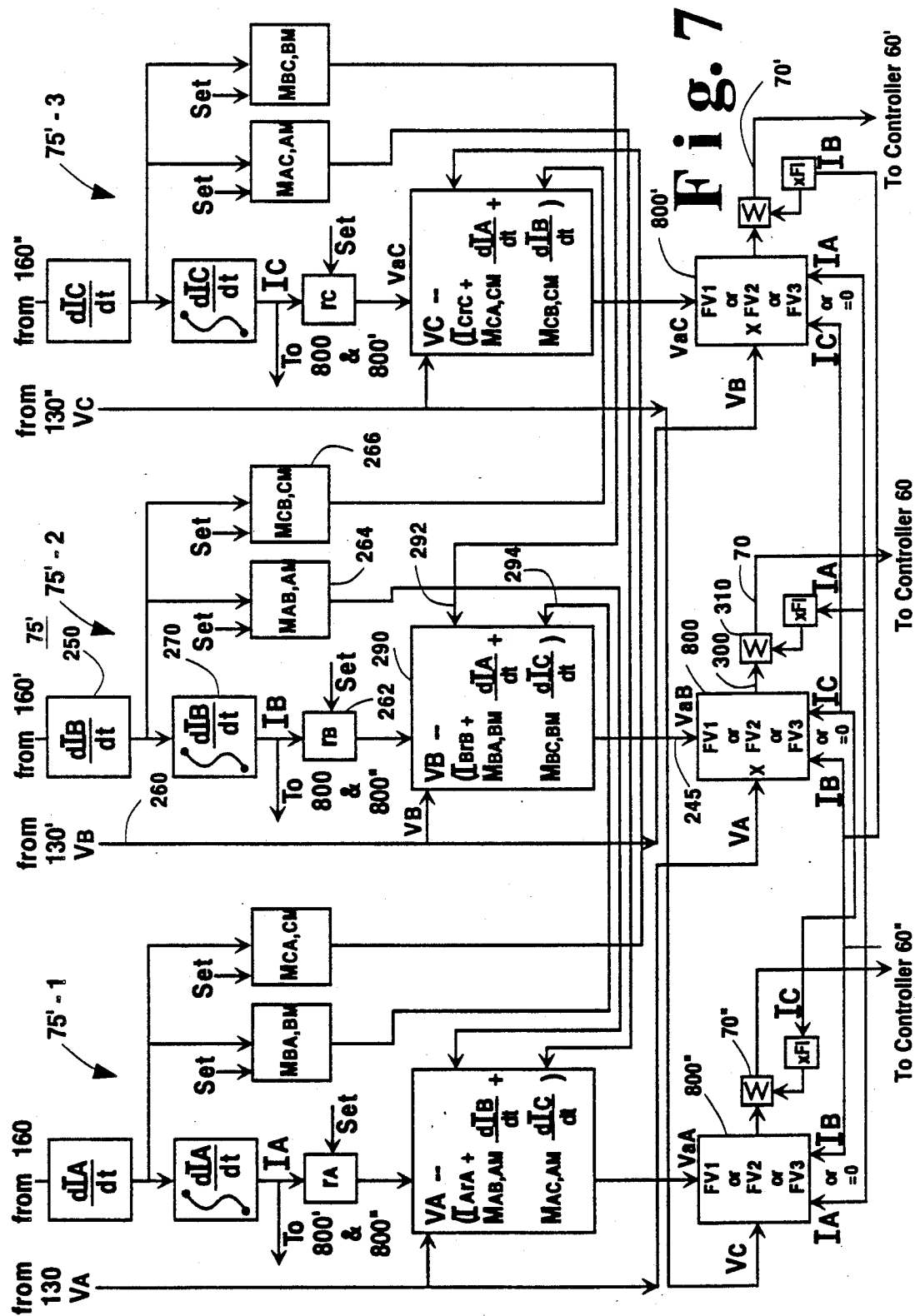
FIG. 7 shows a diagram and flow chart for a programmable controller for use in the present invention.

A particular further embodiment of the present invention is illustrated in FIG. 6 where summing network 75 of FIG. 1 has been replaced by conventional programmable logical controllers at 75', e.g. suitably commercially available units such as ALLEN BRADLEY PLC 5/15 which calculate the values of the arc voltages $V_aA$, $V_aB$, $V_aC$ in accordance with the relationships hereinabove described. The programmed logical controllers (PLC) 75' receive the output of Rogowski coils 160, 160', 160" and values for the respective phase voltages VA, VB, VC, and provide output error signal voltages to controllers 60, 60' and 60" for the appropriate positioning of electodes A, B, C. With reference to FIG. 7, PLC 75'-2, for the electrode B, short circuited by a scrapfall in the above described example, receives the output of Rogowski coil 160' at 250 and phase voltage $V_B$ at 260 and resistance and inductance values are set at 262, 264, 266 for all electrode phases. The input from the Rogowski coil 160' is integrated at 270 and the phase current $I_B$ is multiplied by the set value of $r_B$ at 280 which is subtracted from the phase voltage $V_B$ at 290 together with the applicable mutual reactance values as indicated in accordance with the ciruict of FIG. 5, which are received at 292, 294. The value determined for the arc voltage for phase B, $V_aB$, is obtained from 290 at 295 and applied to network 800 where either scaling factor $FV_1$ or $FV_2$ or $FV_3$ is applied to the phase voltage $V_A$ for the phase ahead i.e. phase A. When $V_aB$ is not equal to zero, i.e. routine regulation conditions prevail, scaling factor $FV_1$ is only applied to $V_A$, the phase ahead voltage and the scaled voltage is compared at 310 to the pre-set signal, $I_A$x$F_i$; when $V_aB$ is equal to zero, i.e. a short circuit at electrode B due to a scrapfall, $FV_2$ is only applied to $V_A$, the phase ahead voltage i.e. phase A; when either the phase current $I_B$ or the phase current $I_c$ of the other phases is zero, due to arc extinguishment by collapse of scrap at either electrode A or C, $FV_3$ is only applied to the phase voltage $V_A$. For any of the foregoing situations, the respective scaled voltage obtained at 300 is summed at 310 with the scaled phase current $I_A$ of the phase ahead and the resultant error signal at 70 is applied to controller 60 of FIG. 6 to move the positioning means 50' for electrode B to achieve the results and benefits hereinbefore described.

The PLC 75'-1 and 75'-3 for phases A and C respectively are similar to PLC 75'-2 for phase B described above and function in the same manner to determine arc voltages $V_aA$ and $V_aC$ for electrodes A and C and provide error signals in the same manner for controllers 60" and 60'.

What is claimed is:

1. A system for regulating the height of each of a first, second and third electrode in an electric arc furnace relative to a charge of material in said arc furnace, with said arc furnace being connected to a three phase source of power through a transformer having secondary windings connected to apply a different phase-to-neutral voltage to each electrode in a predetermined phase sequence and with each electrode having a desired operating height corresponding to a pre-set arc voltage value in a range of 0.5 to 0.85 of the phase-to-neutral voltage applied to each such electrode respectfully, means for generating a variable voltage signal corresponding in value to an instantaneous height of each electrode relative to said charge of material, means for continuously comparing said variable voltage signal with said pre-set arc voltage value to provide an error signal for each electrode, means for adjusting the height of each electrode in response to said error signal and control circuit means responsive to the presence of a short or open circuit condition across each of said electrodes for modifying said pre-set arc voltage values for correcting said short or open circuit condition wherein said control circuit means comprises:

(1) means for monitoring the arc voltage across each electrode for determining the presence of a short circuit condition; and .

(2) means responsive to the presence of a short circuit condition across one of said electrodes for switching the pre-set arc voltage value for the electrode next ahead in phase rotation to a different predetermined value of above 0.85 of the phase-to neutral voltage applied to the electrode and for switching said different voltage value back to said pre-set value when said short circuit condition is corrected.

2. A system as defined in claim 1 wherein upon detection of a short circuit condition said responsive means switches said pre-set arc voltage value across the electrode next ahead in phase rotation to a value between 0.85 and about 0.94 of the phase-to-neutral voltage applied to such electrode.

3. A system as defined in claim 2 wherein said responsive means switches said pre-set arc voltage value back to the original pre-set value when the monitored arc voltage across the short circuited electrode rises to a level corresponding to its pre-set voltage value.

4. A system as defined in claim 3 wherein said means for monitoring said arc voltage comprises coil means inductively coupled to each electrode respectively and means for integrating the signal induced in each coil from which the instantaneous arc voltage across each electrode is determined.

5. A system as defined in claim 1 wherein said control circuit means further comprises first means for detecting the presence of an open circuit condition across each electrode, means responsive to when said first means for switching the pre-set voltage values for electrodes to a lower set of values and for switching back to the original pre-set values when the open circuit condition has been corrected.

6. A system as defined in claim 5 wherein when an open circuit condition is detected across one electrode, the pre-set voltage values for the other two electrodes are decreased to about 0.28 of the phase-to-neutral voltages applied to each such electrode.

* * * * *